INVENTOR
CLEOPHAS PHILEMON BAUM

ATTORNEY

Patented Jan. 15, 1946

2,392,830

UNITED STATES PATENT OFFICE 2,392,830

AIRPLANE LIFT DOLLY

Cleophas Philemon Baum, Washington, D. C.

Original application June 1, 1943, Serial No. 489,267, now Patent No. 2,362,981, dated November 21, 1944. Divided and this application July 29, 1944, Serial No. 547,241

2 Claims. (Cl. 254—8)

(Granted under the act of March 3, 1883, as amended April 30, 1928; 370 O. G. 757)

The subject of this invention is the construction of a suitable spotting dolly for use on aircraft carriers and in close quarters on landing fields and in hangers, for moving airplanes around, and into and out of compact parking arrangements. Some of the essential requirements of such dolly are that it may be operated by one man, that it will lift an airplane wheel substantially vertically without affecting the airplane otherwise, that it will be movable in any horizontal direction, and that it will be quickly releasable without causing lateral or longitudinal movement of the airplane.

The object of the subject device is to provide a dolly that will meet the above requirements and will be simple and compact in construction yet sufficiently rugged to withstand rough handling.

A further object is to construct a dolly which is adapted to embrace and quickly raise one wheel, but will engage only the tire and will not contact any other part of the airplane, such as the hub, axle, etc., and will not require any special fittings added to the airplane for lifting purposes.

A further object is to build a dolly so that it may be applied from the outboard side of either of the two conventional non-swivelling main wheels of an airplane without endangering the operator by a moving propeller or obliging him to crawl under the lower wing of a conventional biplane.

Further and more specific objects will become apparent as the description of the subject devices proceeds. Several illustrative forms of these devices are shown in the parent application of which this is a division, one of the forms being shown in the accompanying drawing in which.

The same numerals are used to designate corresponding parts in the two views of the drawing.

Figure 1:
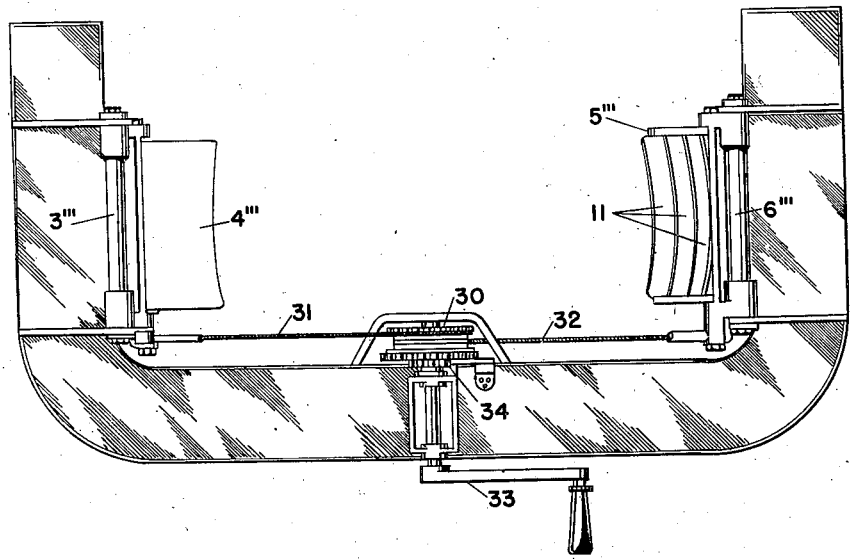
Fig. 1 is a plan view of one specific form of the device.
Figure 2:
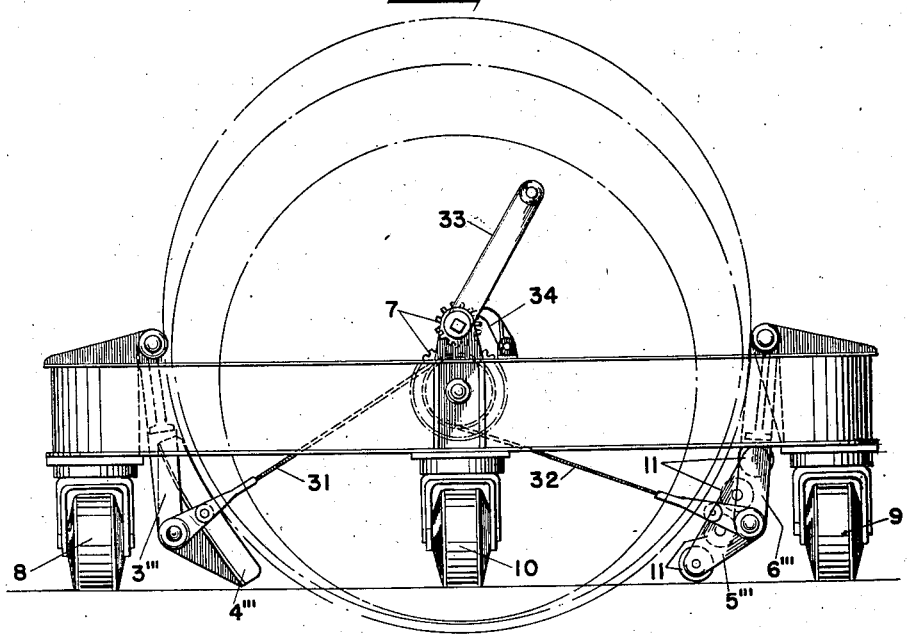
Fig. 2 is an elevation thereof.

The device herein disclosed is one specific form of the devices disclosed in the parent application Ser. No. 489,267, filed June 1, 1943, and issued November 21, 1944, as Patent No. 2,362,981, of which this is a division. It has means for applying a pair of shoes to the underside of a tire on an airplane, one shoe in front of the point of tire contact with the ground and the other in back of it, then lifting the tire off the ground by moving one or both shoes.

In this form of my device the base is of the rigid C form and has a pulley arrangement 30 mounted at the middle of its side portion. The pulley is provided with lines 31 and 32 running therefrom to the two shoes 4''' and 5''' which are mounted on hinged brackets 3''' and 6''' respectively on the open ends of the C formed base. The pulley is operated through a gear reduction means 7 by hand crank 33 which has a pawl and ratchet mechanism 34 for locking it in place. This form is equipped with casters 8, 9 and 10 that are swivelled to turn in any direction just as the other forms described in the parent application.

The shoes are grooved to keep the tire from slipping off during the raising operation. One of the shoes, as for example, 4''' is merely a curved grooved plate whereas the other, 5''', is formed by a series of rollers 11 having a curved taper toward the middle corresponding to the curvature of a groove similar to that in shoe 4'''. Thus, as the pulley is operated to swing the brackets 3''' and 6''' inwardly during a raising operation, the shoes 4''' and 5''' are gradually raised and simultaneously moved toward each other. This causes the tire to roll over the shoe 4''' while the rollers 11 roll under the tire.

In the construction of these devices the leverage system should be so designed that if the raising means is actuated by a short ratchet lever, or a hand crank, as shown, the maximum allowable effort applied at the end of the lever or crank shall be approximately 50 pounds. A lesser amount is desirable.

It is obvious that various modifications in form, dimensions and arrangement may be made without departing from the scope of this invention as defined by the appended claims.

This invention may be used by or for the Government of the United States of America for governmental purposes without the payment of any royalties thereon or therefor.

What is claimed is:

1. A lifting dolly composed of a horizontally disposed C frame provided with swivelled casters, a hingedly suspended bracket on each end of the C frame, a shoe at the lower end of each bracket, a pulley mounted on the frame between its ends, a pair of cords attached to the pulley at one end, passed over the pulley in the same direction and having their other ends attached to the lower ends of the brackets, reduction gearing and a hand-crank for operating said pulley to oscillate the shoes inwardly, and locking means for said hand-crank.

2. A lifting dolly composed of a horizontally disposed C frame provided with swivelled casters, a hingedly suspended bracket on each end of the C frame, a shoe at the lower end of each bracket, a pulley mounted on the frame between its ends, a pair of cords attached to the pulley at one end, passed over the pulley in the same direction and having their other ends attached to the lower ends of the brackets, reduction gearing and a hand-crank for operating said pulley to oscillate the shoes inwardly, and locking means for said hand-crank; said shoes being grooved to fit under a wheel and keep it from slipping off during raising and lowering operations, at least one of said grooves being formed by rollers disposed across the shoe and having a correspondingly curved taper, so as to eliminate sliding friction between the wheel and the shoe during operation, while preventing the tire from running off the shoe.

CLEOPHAS PHILEMON BAUM.